United States Patent [19]

Helgert et al.

[11] Patent Number: 5,003,390

[45] Date of Patent: Mar. 26, 1991

[54] SEARCH AND LOCK TECHNIQUE FOR RELIABLE ACQUISITION OF DATA TRANSMITTED VIA TELEVISION SIGNALS

[75] Inventors: Hermann J. Helgert, Washington, D.C.; Mark S. Richer, Alexandria, Va.; William Posner, Plainview, N.Y.

[73] Assignees: PBSE Enterprises, Inc., Alexandria, Va.; EEG Enterprises, Inc., Farmingdale, N.Y.

[21] Appl. No.: 498,973

[22] Filed: Mar. 26, 1990

[51] Int. Cl.⁵ .................. H04N 7/08; H04N 7/087
[52] U.S. Cl. ................................. 358/142; 355/146; 355/147
[58] Field of Search .............. 371/5.5, 57.2, 69.1; 358/142, 147, 146

[56] References Cited

U.S. PATENT DOCUMENTS

| | | | |
|---|---|---|---|
| 4,577,227 | 3/1986 | Gurumurthy | 358/147 |
| 4,606,029 | 8/1986 | Nagao et al. | 371/69.1 |
| 4,638,497 | 1/1987 | Komatsu et al. | 358/147 |
| 4,709,376 | 11/1987 | Kage | 371/69.1 |
| 4,891,703 | 1/1990 | Noudan | 358/142 |

Primary Examiner—John W. Shepperd
Assistant Examiner—Michael D. Parker
Attorney, Agent, or Firm—Burns, Doane, Swecker & Mathis

[57] ABSTRACT

The present invention is directed to the implementation of a reliable data communications system using the horizontal scan lines of video signals, and is particularly concerned with the minimization of problems which are caused as a result of false acquisition of horizontal scan lines and missed or dropped lines. In accordance with the present invention, a two-tier approach to receiving data transmitted via television signals is used. The two-tier approach includes a search mode and a lock mode. The present system operates on the principle that if a horizontal scan line (or lines) has been perfectly identified to contain data for successive fields of a video signal, then this scan line (or lines) can be presumed to be a valid data bearing scan line (or lines) in fields of the video signal yet to be received. The lock mode is then utilized to favor the retrieval of what would otherwise be missed or dropped horizontal scan lines were the system operating in the more restrictive search mode.

16 Claims, 5 Drawing Sheets

SEARCH AND LOCK TECHNIQUE FOR RELIABLE ACQUISITION OF DATA TRANSMITTED VIA TELEVISION SIGNALS

BACKGROUND OF THE INVENTION

The present invention is directed to the implementation of a reliable data communications system using the horizontal scan lines of video signals, and is particularly concerned with the minimization of problems which are caused as a result of false acquisition of horizontal scan lines and missed or dropped lines.

In the transmission of digital data, for example from one computer to another, it is common to employ existing communication media where the data is to be transmitted over large distances, and thereby avoid the need for dedicated data transmission lines. For example, the use of telephone lines to communicate data between computers, via modems, is one popular form of data transmission. However, since telephone lines were originally designed for voice grade communications, they offer limited bandwidth capabilities for data communication. As a result, the speed at which data can be transmitted over telephone lines, i.e., the available baud rate, is limited.

In an effort to increase the speed at which data can be efficiently transmitted, other existing forms of transmission media are being evaluated. One such medium is the television communication network. The transmission bandwidth that is available in a standard television channel can readily accommodate the transmission of data at higher rates. Furthermore, the availability of television reception at almost any locale makes television transmission a viable medium for communicating data from a central location to another location at a relatively low cost.

Typically, data is transmitted in a television signal by inserting the data in one or more lines of the vertical blanking interval of a standard television field. Since the vertical blanking interval does not contain any video information, e.g., any information pertaining to the image to be reproduced on a television screen, the placement of data on one or more of these lines of the signal does not interfere with the normal television program.

The transmission of data via television signals is not without its attendant limitations, however. Among these are the various types of noise that can be encountered when the television signal is transmitted through a commonly employed transmission medium, e.g., over the air or through cable. The effect of this noise is to create errors in individual bits of the data. By encoding the transmitted data with a suitable error checking code, individual bit errors can be readily identified in the received data and corrected.

Systems which insert digital data onto a horizontal scan line of a video signal typically utilize a specific bit pattern as a preamble which is transmitted with the data and which identifies the accompanying data, to enable it to be acquired by a receiver. Many of these systems use specific bit patterns for the preamble portion of the transmitted data which have properties to help prevent missing data in the presence of noise. The specific bit patterns are typically chosen so that receivers can select the proper data in the presence of a limited number of bit errors in the received bit pattern. Systems which incorporate these features thus enable data to be reliably reconstructed at the receiving end without missed or dropped lines of data, even when noise results in bit errors.

However, such systems do not provide fail-safe transmission and reception of the data via the television signals. Because the system has a certain amount of tolerance in choosing the horizontal scan line or lines containing data which is to be processed, the false acquisition of data can, and often does, occur. It is possible to decrease the frequency of false acquisition by making the receiver more selective in its acceptance of data. However, such a change increases the possibility that desirable data would be missed in the presence of noise. Accordingly, it would be desirable to provide a system of data transmission via the use of television signals whereby data could be accurately transmitted and received without missed or dropped horizontal lines of data while at the same time minimizing the false acquisition of data.

BRIEF STATEMENT OF THE INVENTION

In accordance with the present invention, the foregoing object is achieved using a two-tier approach to receiving data which has been transmitted via television signals. With this method, the desire to avoid the false acquisition of data is balanced with the desire to avoid the occurrence of missed or dropped horizontal lines of data. The two-tier approach of the present invention includes two modes of operation: a search mode and a lock mode.

In accordance with a preferred embodiment, the receiver processes a number of horizontal scan lines in each field of the video signal during the search mode to detect a perfect match of a specific bit pattern forming a preamble for data transmitted in a designated horizontal scan line. The search mode thus avoids the false acquisition of data in a horizontal scan line by ensuring precise identification of the scan line containing the data.

Once the correct bit pattern of a preamble has been detected in the same horizontal scan line for plural fields of the video signal in the search mode, the system switches to a lock mode of operation. In the lock mode, for each new field of the video signal, the receiver processes only the data in the particular scan line which has been identified in the search mode as the data-bearing scan line. Because of the high degree of reliability that this scan line contains data, as determined in the search mode, less than a perfect match of the bit pattern forming the preamble of data contained in the identified horizontal scan line is acceptable in the lock mode. The lock mode therefore favors the avoidance of missed or dropped lines of data.

Accordingly, the present system operates on the principle that if a horizontal scan line (or lines) has been reliably identified as containing data for successive fields of a video signal, then this scan line (or lines) can be presumed to be the data-bearing scan line (or lines) in fields of the video signal yet to be received. The system is therefore functioning properly such that some flexibility in the detection of the data-bearing horizontal scan line (or lines) can be afforded. The lock mode is thus utilized to favor the retrieval of what might otherwise be missed or dropped horizontal scan lines were the system operating in the search mode.

DESCRIPTION OF THE PREFERRED EMBODIMENTS

In the following detailed description of preferred embodiments of the invention, specific reference is made to the transmission of data within the horizontal scan lines of a television signal vertical blanking interval. To further facilitate an understanding of the invention, it is described with specific reference to an example in which the data is assembled in blocks of 36 bytes, with the blocks being transmitted in the same single VBI horizontal scan line of successive fields of the video signal being used for a given transmission. It will be appreciated, however, that specific applications of the invention are not so limited. Rather, the present invention is applicable to any form of data transmission in which it is desirable to balance the false acquisition of data contained in the horizontal scan lines of a video signal against the avoidance of missed or dropped lines of data.

Figure 1:
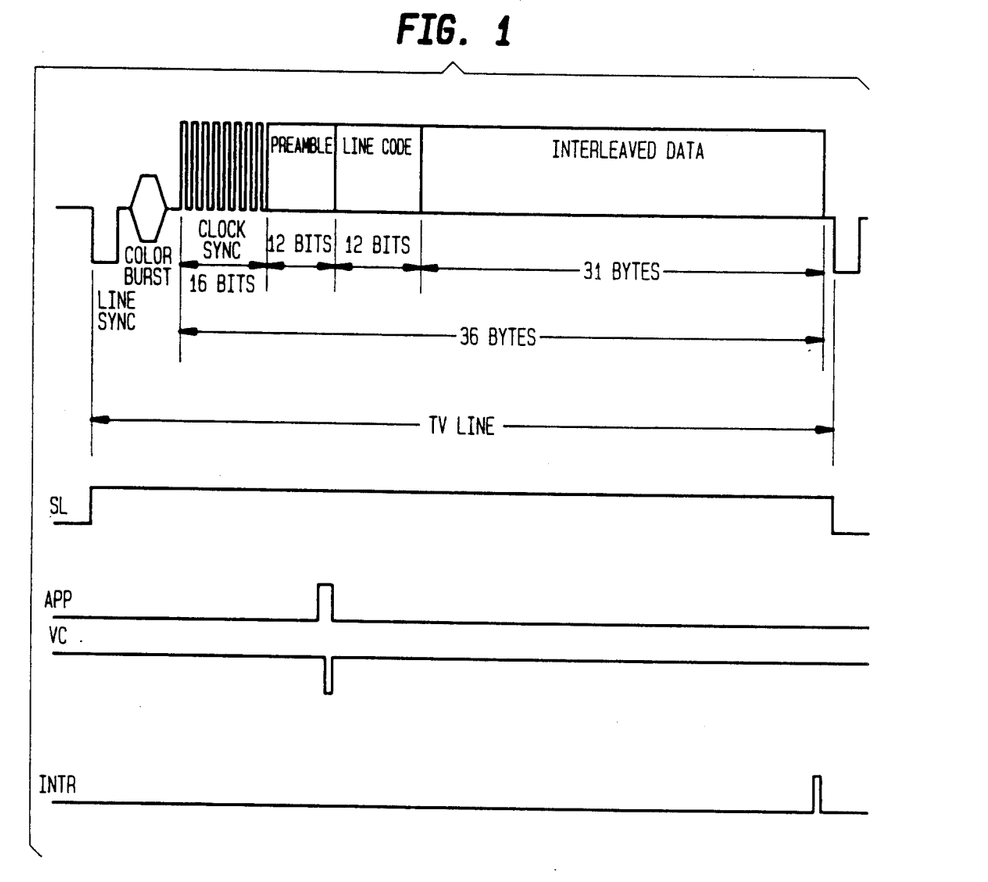
FIG. 1 is a timing diagram which shows various waveforms useful for understanding the present invention.

Referring to FIG. 1, a horizontal scan line containing horizontal synchronizing pulses is shown. This illustrated line does not contain video information, and therefore might be located in the vertical blanking interval of the video frame. Digital data which has been inserted onto the horizontal scan line is also shown in FIG. 1 and includes 36 bytes. In accordance with a preferred embodiment of the present invention, the first 28 bits, (i.e., the first 3 and one half bytes) within each horizontal scan line represent a preamble to the remaining bytes of transmitted data which immediately follow the preamble. This data might comprise an initial 12-bit line code followed by 31 bytes of encoded data, as described more fully in U.S. patent application Ser. No. 167,016, filed Mar. 11, 1988.

The first two bytes of each preamble are used for clock synchronization. The remaining 12 bits of the preamble represent a framing code which identifies the boundaries of bytes of data. Specific data patterns are chosen for the 12 bit framing code, these patterns being defined such that each pattern has a distance property in excess of two. Therefore, a receiver can accept the transmitted data with a framing code having up to 2 bits in error.

In accordance with the present invention, a video data receiver identifies data transmitted via the horizontal scan lines of a video television signal as follows. The video signal is received by the receiver and the horizontal scan lines are searched with a high degree of accuracy for an error-free bit pattern during a search mode of operation. In a practical system of the type to which the present invention applies, several different types of data might be transmitted via different respective lines in the vertical blanking interval. For example, the different types of data might be associated with different information-providing services. These different types of data are distinguished from one another by unique framing codes. Therefore, the framing code portion of the preamble transmitted on the scan line is first examined by the receiver to determine whether data in a particular line is the type which it is intended to receive.

The initial 16-bit clock synchronization signal may be the same for all lines of data, and therefore non-unique. The present invention is primarily concerned with the unique framing code. Accordingly, the term "preamble" as used hereafter in the context of the invention refers to the unique 12-bit framing code.

During the search mode, an exact match of the 12 bit pattern forming the preamble must be obtained. This feature ensures that the single, data-bearing horizontal scan line of the currently inspected video field will be accurately identified. The search for the preamble in each horizontal scan line of a field occurs during a narrow aperture window which is timed to coincide with the expected occurrence of the twelfth bit of the preamble in a given horizontal scan line. The receiver will determine whether valid data has been received when a perfect 12 out of 12 bit match has occurred within the aperture window.

The step of searching the horizontal scan lines for an exact bit match is repeated for successive fields of the video signal, and each successively received data bearing line is counted. Once a valid preamble has been detected in a particular scan line for a predetermined number "S" of successive fields, a signal is produced. Upon generation of this signal, the receiver switches from the search mode to a lock mode of operation.

In the lock mode of operation, an exact 12 out of 12 match is no longer necessary for the receiver to process the data contained in the given horizontal scan line. Rather, because the particular horizontal scan line used for data transmission has been verified via the receipt of the S successive fields of valid data, an assumption can now be made that there is a high probability of valid data transmission in that same scan line for subsequent fields. In the lock mode, data contained in a designated horizontal scan line will therefore be processed if at least 10 out of 12 bits contained in the preamble of the horizontal scan line being examined match an expected pattern. Accordingly, in the lock mode, the receiver will accept any data for which a valid code decision represented by at least a 10 out of 12 bit match has been made. The receiver will therefore operate to avoid the loss of data due to bit errors in the preamble caused by noise or the like.

Once the system switches to the lock mode, the failure to detect a valid preamble, i.e., at least 10 out of 12 correct bits, in a field is detected and stored in a counter. If the number of successive fields in which a valid preamble is not detected exceeds a limit L, it is assumed that data acquisition has been lost. In this case, the receiver switches out of the lock mode and back into the search mode to once again require exact bit matching of the preamble portion in each horizontal scan line. The values of S and L are chosen based upon the application and the environment in which the system is utilized.

Figure 2:
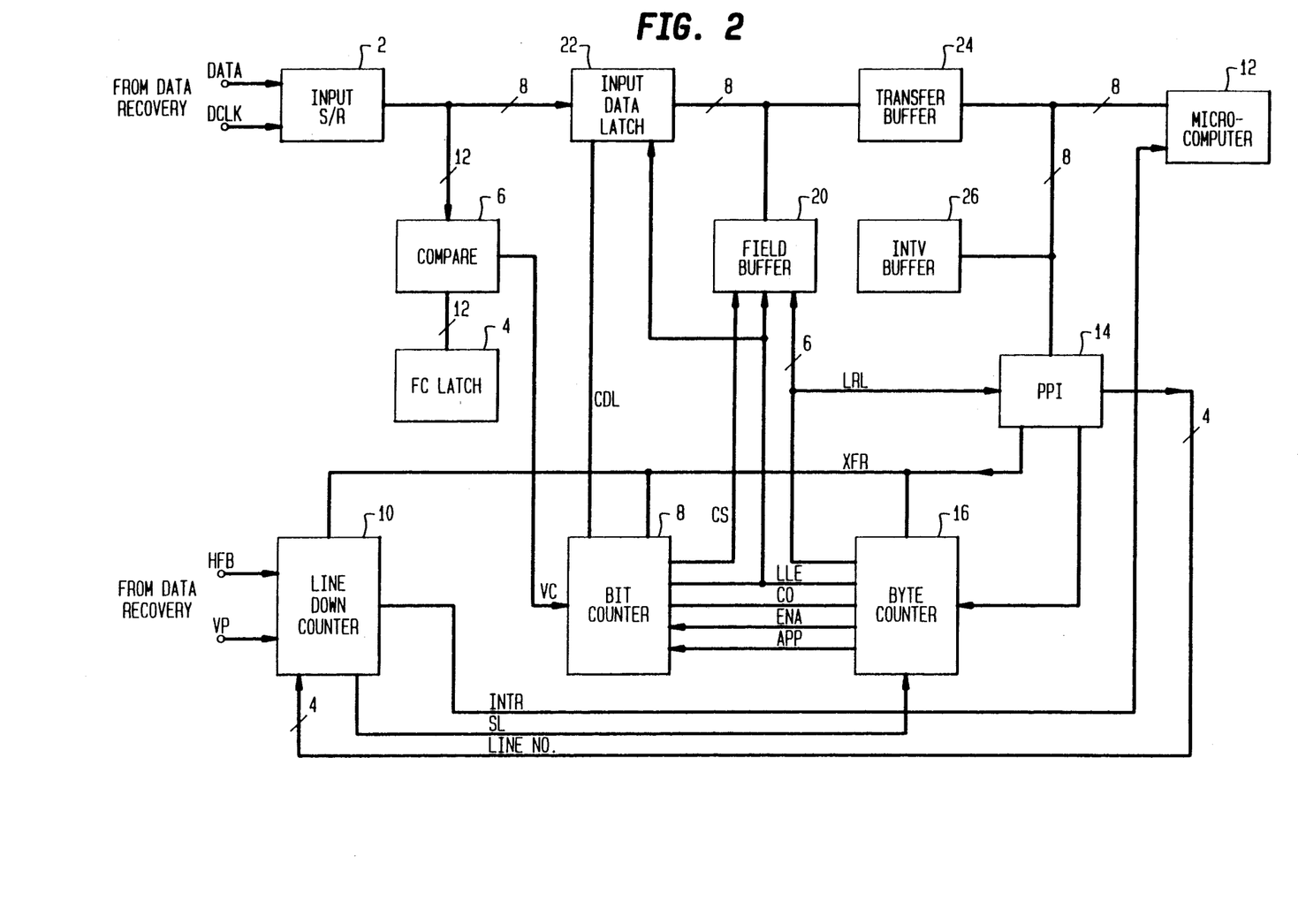
FIG. 2 is a general schematic view of a system for implementing the present invention.

Turning now to FIG. 2, a block diagram of one implementation of a receiver operated in accordance with the principles of the present invention is shown. More specifically, FIG. 2 depicts a preferred embodiment of a search and lock system which could be included in a receiver to implement the present invention.

As shown in FIG. 2, bits of data transmitted via a VBI horizontal scan line are recovered and clocked into an input shift register 2 by the receiver's data clock DCLK. A preamble bit pattern, more particularly a desired framing code (FC), is provided by a framing code latch 4. The framing code latch is a shift register that is loaded with an expected bit pattern during an initiation phase of the receiver.

The bits of data which have been input to the shift register 2 are compared with the corresponding bits contained in the framing code latch 4 via a comparator 6. An output signal VC is produced by the comparator for each bit of data which is clocked into the input shift register 2. However, the output signal VC is true only when a valid code has been detected.

The output signal VC of the comparator 6 is true if there is at least a 10 out of 12 bit match between the contents of the input shift register 2 and the contents of the framing code latch 4. To achieve this result, the comparator 6 can comprise twelve exclusive-OR gates which respectively compare the bits stored in the input shift register 2 with the bits of the pattern stored in the framing code latch 4. The output signals of the exclusive-OR gates form an address for a PROM contained within the comparator 6 which provides a valid code response (e.g., represented as a "1") if a 10 out of 12 bit match has been detected, i.e., at least ten of the output signals from the exclusive-OR gates are logical zeroes. The valid code signal VC is fed to a bit counter 8.

A line down counter 10 is provided and is clocked by horizontal synchronizing pulses (or horizontal flyback pulses) represented in FIG. 2 as the input HFB. The line down counter also receives the vertical synchronizing pulses VP, which serve to initialize the counter. The line down counter 10 is loaded with a 4-bit count corresponding to a line number received from a microcomputer 12 through a programmable parallel interface (PPI) 14. The programmable parallel interface 14 provides an interface for a data recovery circuit (not shown), a tuner (not shown) and an E-PROM (not shown), as well as the counters.

The line down counter 10 uses the horizontal synchronizing signals HFB and the vertical pulses VP to locate the particular VBI horizontal scan line which is specified by a signal received from the microcomputer 12 via the PPI 14 over the signal line 18. Upon the occurrence of a vertical pulse VP, the counter 10 is reset with the number appearing on the line 18. The counter then counts down upon the occurrence of each horizontal pulse until it reaches zero. The line down counter generates a selected line signal SL after counting a number of horizontal synchronization pulses corresponding to the specified line number. This selected line signal SL enables the bit counter 8 and a byte counter 16.

The bit counter 8 and the byte counter 16 are clocked by the receiver's data clock DCLK which, as mentioned previously, also clocks data through the input shift register. Four signal lines interconnect the bit counter 8 and the byte counter 16. A line CO transmits a carry bit to the byte counter from the bit counter, which makes these counters function as a 9-bit counter. The line ENA transmits an enable signal for enabling the bit counter in response to an input of the signal SL into the byte counter. The signal APP is an aperture gating signal which is generated in response to receipt of the signal SL from the line down counter. The byte counter 16 counts a number of data clock pulses DCLK after receipt of the selected line signal SL to generate the start and duration of the aperture. The aperture is, in a preferred embodiment, 3 microseconds wide, and is centered around an expected time for the receipt of the true signal on the line VC. Thus, in the illustrated example, the aperture is centered around the expected time of occurrence of the 28th bit after a horizontal synchronizing pulse is received. The signal LLE is a line latch enable signal which closes the aperture window and resets the counter upon the occurrence of a true VC signal within the aperture window.

Output signal lines from the bit counter 8 and the byte counter 16 are connected to a field buffer 20. The first of these lines, designated CS, is a chip select signal. The second line transmits the line latch enable signal LLE. The signal control line LLE is also connected to an input data latch 22 as can be seen in FIG. 2. The chip select and line latch enable signals control the transfer of data via the input data latch 22 (connected to the output of the input shift register 2) to the field buffer 20. An output line CDL, connected between the bit counter 8 and the input data latch 22, represents a clock data latch and is generated on the occurrence of each byte boundary.

The signal LLE acts as the output enable for the input data latch 22 and places the field buffer 20 into a "write" mode. The signal CS is used to clock the bytes of data into the field buffer 20 while the signal CDL is used to clock the bytes of data into the input data latch 22.

The field buffer 20 is a memory which stores data received from the input data latch 22 at locations specified by a 6-bit address from the byte counter 16. One of the bits of this address, labelled LRL, goes low when the 32nd byte of data has been stored. The LRL bit is read by the microcomputer 12 after passing through the programmable parallel interface 14 and is tested to determine if data has been recovered.

The line down counter 10 generates an interrupt signal INTR near the end of each selected line designated by the line number from the microcomputer. When the interrupt signal INTR is provided to the microcomputer 12 from the line down counter 10 following data recovery, the microcomputer accesses an INTV buffer 26, which supplies an interrupt vector pointer to the microcomputer 12. The microcomputer 12 then checks the signal on the line LRL to determine whether data has been recovered and stored. A transfer buffer 24 is used for data transfer from the field buffer to the microcomputer upon the initiation of a transfer pulse XFR from the programmable parallel interface.

In operation, the data receiver is first placed into a search mode wherein the microcomputer 12 feeds successive line numbers to the line down counter 10. The receipt of a vertical synchronizing pulse VP causes the line down counter 10 to be preset with the horizontal scan line number currently present on the 4-bit line 18 designated LINE NO. The line down counter 10 is then decremented with the receipt of each horizontal synchronization pulse (corresponding to the start of successive horizontal scan lines) received on the line HFB.

Upon being decremented to zero, the line down counter generates the selected line pulse SL which enables the bit counter 8 and the byte counter 16. The line down counter thus insures that the bit and byte counters will be enabled at the correct time to examine VC signals from the comparator 6 for a predetermined horizontal scan line of the video signal. Upon the occurrence of the signal SL, the bit and byte counters are enabled so as to begin counting clock pulses DCLK.

The byte counter 16 thereafter produces the gating or aperture signal APP. If a valid VC signal is detected at any time within this aperture, at least a 10 out of 12 bit match has occurred in the preamble portion of data transmitted in the specified horizontal scan line. Accordingly, the data in the VBI horizontal scan line associated with the preamble can now be further processed. The enable and aperture signals received by the bit counter 8 from the byte counter 16 are thus used to qualify the signal VC received from the comparator 6. Only if the signal VC falls within the aperture window designated by the signal APP will the bit counter logic indicate that a true signal on the line VC is present.

Upon the occurrence of a true VC signal, the line latch enable signal is generated on the line LLE, a clock data latch signal CDL is generated and a chip select signal CS is generated by the bit counter 8, to load the data associated with the correctly identified preamble into the field buffer 20 via the input data latch 22. The line latch enable signal closes the APP window and resets the bit and byte counters so that subsequent counts of these counters can be used to address locations in the field buffer. In other words, since these counters and the input shift register 2 are all clocked by the clock signal DCLK, resetting the counters permits them to be synchronized to the incoming data which follows the preamble in the horizontal scan line. The last bit of the byte counter 16, designated LRL, i.e., line recovered latch, is also used to signal the microcomputer 12 that data has been stored.

Near the end of the selected line of the VBI, the microcomputer 12 receives the interrupt signal INTR from the line down counter 10. In response to the interrupt, the status of the LRL bit is checked. This bit will be low only if data has been stored in the field buffer 20. Having been signalled that valid data is stored in the field buffer, the microcomputer can then control the transfer buffer 24 to move the data from the field buffer into the microcomputer upon the occurrence of the transfer pulse XFR.

Once the stored data has been transferred to the microcomputer 12, it selectively examines the preamble of the data in accordance with the particular acquisition mode it is in. A search and lock operation of the microcomputer 12 in the circuit illustrated in FIG. 2 will now be described with respect to the flow charts of FIGS. 3A and 3B, wherein the tenth through the twentieth VBI horizontal scan lines of a video signal are examined for the presence of valid data.

Figure 3A:
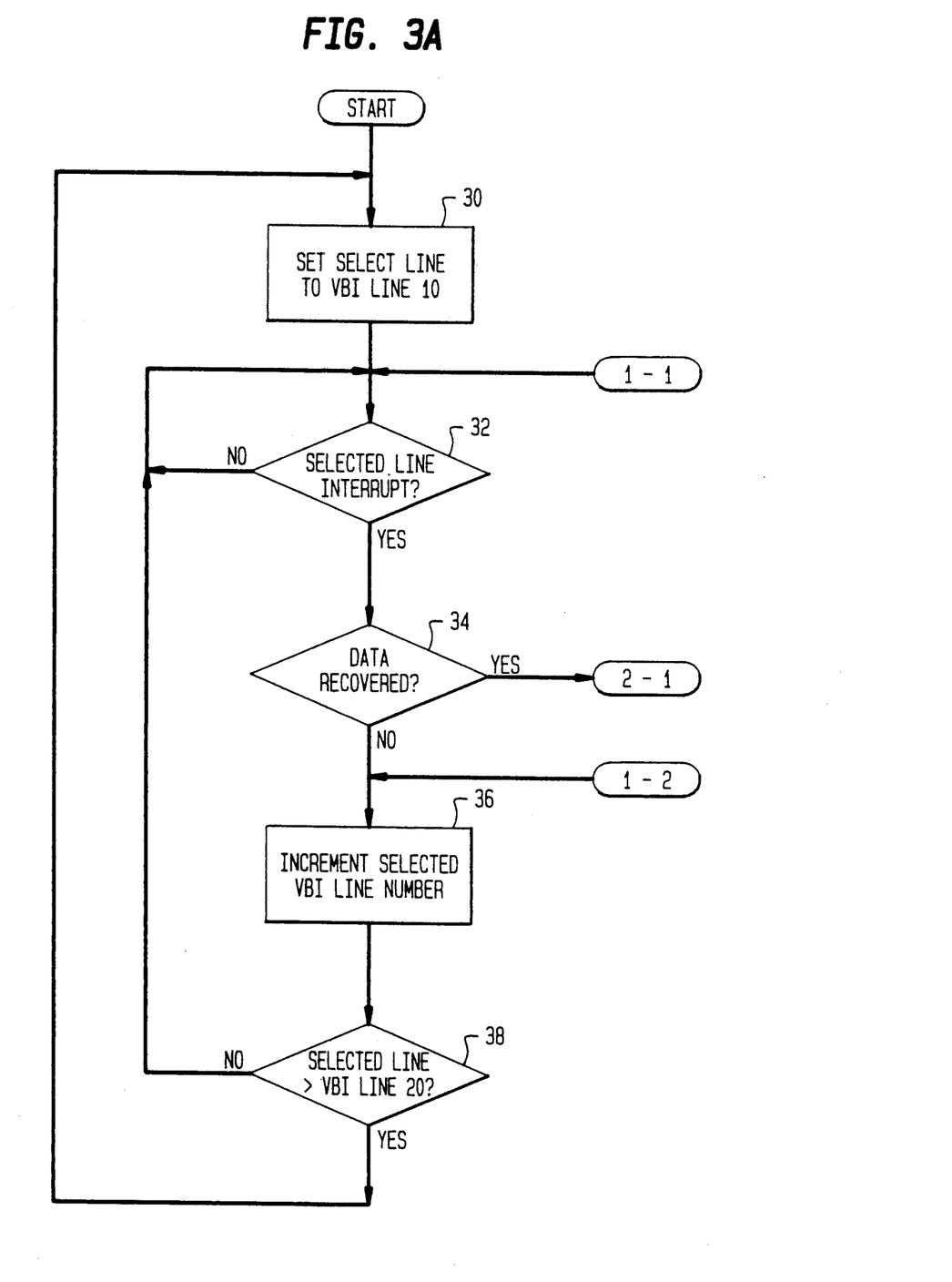
FIGS. 3A-3B are a flow chart showing the search and lock operation for a preferred embodiment of the present invention; and, FIG. 4 is a flow chart showing the lock and line unlock operation for a preferred embodiment of the present invention.

At the onset of the operation of the circuit, the horizontal lines of the VBI are scanned to locate those which contain data. Thus, the microcomputer first sets the selected VBI line number to ten (step 30) and then waits for an interrupt indicating that the tenth line of the VBI has been received (step 32). Upon receipt of the interrupt, the micro-computer determines whether data has been recovered in that line (step 34), for example by examining the value of the LRL bit stored in the PPI 14. If no data was recovered from that line, the selected line number is incremented by one at step 36, and this process is repeated through the twentieth VBI line. After the twentieth line, if no data has been recovered the selected line number is incremented to twenty-one. At step 38 the microcomputer 12 detects that the selected line number is greater than twenty, and it therefore branches to step 30, where the line number is reset to ten. Through this process, the microcomputer continually scans the tenth through the twentieth lines for the presence of data.

Figure 3B:
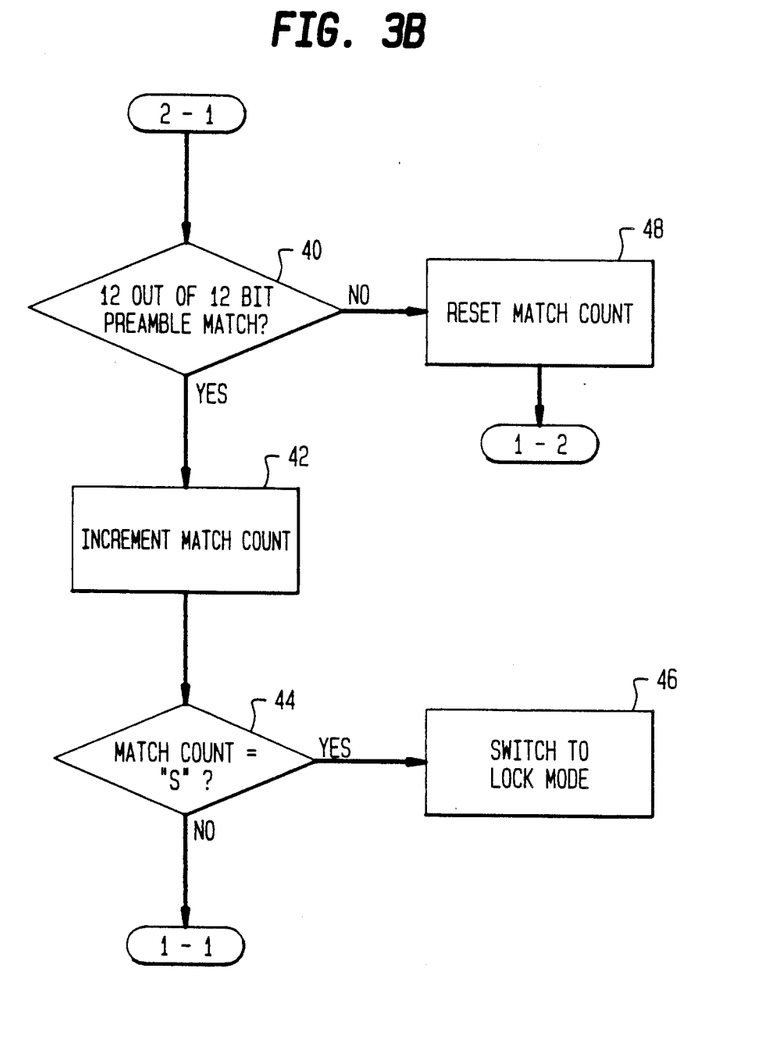

When data is detected on a line at step 34, the microcomputer reads the data from the transfer buffer 24 and branches to the subroutine of FIG. 3B. Every line of data that is transferred to the microcomputer has been determined to have a preamble in which at least 10 of the 12 bits are correct due to the operation of the comparator 6. However, when the system is in a search mode designed to minimize false acquisition, an exact match of all 12 bits in the preamble must be obtained for the data to be accepted. Thus, when data is received on the selected line, the microcomputer examines all 12 bits of the received preamble to detect an exact match (step 40). If an exact match is detected, the data is accepted, e.g., passed on to a decoder, and the microcomputer increments an internal match count (step 42).

For each successive field in which the selected line contains data having a preamble with an exact 12-bit match, this internal counter continues to be incremented until a predetermined match count value S is reached, which is detected at step 44. Once this event occurs, the microcomputer switches to the lock mode (step 46), since it can be reliably assumed that valid data is being received.

Prior to the time that the count value of the match counter reaches S, if the preamble of a line of received data does not have an exact match as detected at step 40, the match counter is reset (step 48). When this occurs, the microcomputer returns to the subroutine of FIG. 3A at step 36, where the selected line number is incremented, since it is assumed that valid data no longer exists on the previous selected line. This process of scanning the VBI lines for valid data and examining a selected line for an exact preamble match continues until S lines of matched preambles are received in S successive fields.

In the lock mode, the microcomputer does not examine the preamble of the scan line number designated during the search mode for an exact match. Rather, every line of data that is transferred to the microcomputer is accepted, since it has already been determined to have a preamble with at least a 10-of-12 bit match via operation of the comparator 6.

Figure 4:
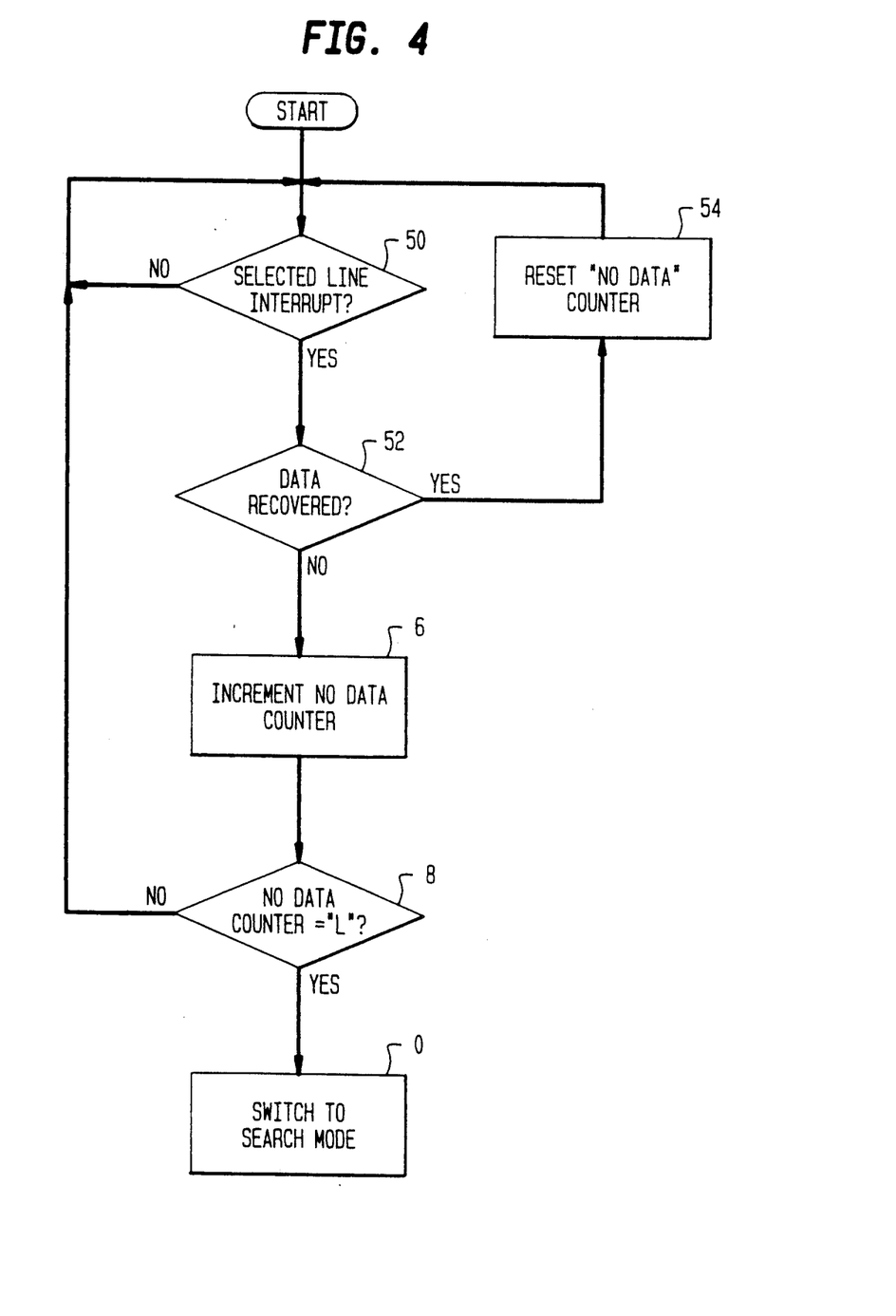

The lock mode and the unlock operation of the microprocessor will now be described with reference to FIG. 4. In the lock mode, the microprocessor monitors the data acquisition process to ensure that valid data (i.e., matched framing codes) are still being received. More particularly, each time that the line down counter 10 generates an interrupt to signal the end of a selected scan line (step 50), the microprocessor examines the LRL bit to determine whether data was stored from that line (step 52). If data was stored, an internal "no data" counter is reset to zero (step 54).

The microcomputer will exit the lock mode if data has not been stored for a predetermined number of successive fields, as may occur following a completed transmission of data. Thus, if data has not been recovered when the selected line interrupt occurs, as detected at step 52, the "no data" counter is incremented (step 56). As long as the value of this counter is less than a preselected number L, the system remains in the lock mode of operation. However, if the "no data" counter reaches a value of L (step 58), meaning that L successive received fields did not contain data on the selected VBI line, the system switches back to the search mode at step 60, i.e., it returns to the subroutine of FIG. 3A.

Thus, it can be seen that the present invention provides a data acquisition system which balances the need to avoid false acquisition of data with a lower probability risk of missing or dropped lines of data. These competing objectives are met with a dual mode approach that is dynamically varied in response to the validity of the received data.

It will be appreciated by those of ordinary skill in the art that the present invention can be embodied in other specific forms without departing from the spirit or essential characteristics thereof. For example, although disclosed in the context of data transmissions that take place within the vertical blanking interval of a television signal, the practical applications of the invention are not limited thereto. Similarly, the use of a 12-bit preamble having a distance property of two is exemplary of but one embodiment of the invention.

The presently disclosed embodiment is therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A method for identifying data transmitted via the horizontal scan lines of a video television signal, comprising the steps of:
   receiving a video signal and detecting at least one predefined horizontal scan line in each field of the signal;
   inspecting the detected horizontal scan line for the presence of data during a search mode, in which a predetermined number of successive bits of data are compared with a defined bit pattern to determine if n bits in said predetermined number of bits match the bits in said pattern;
   repeating said inspecting step to detect horizontal lines of valid data in multiple fields of the video signal;
   indicating when a predetermined number of successive lines of valid data have been detected; and,
   switching from said search mode to a lock mode in response to said indicating, said lock mode including the steps of:
      examining said detected horizontal scan lines and accepting data therein as valid data if a permissible number of bits less than n in said predetermined number of successive bits match the bits in said pattern;
      recording the number of successive predefined horizontal scan lines which do not contain valid data; and,
      returning to said search mode of operation if said recorded number exceeds a preset limit.

2. The method of claim 1 wherein n is equal to said predetermined number.

3. The method of claim 1, further including the step of defining a time window in response to the detection of said predefined scan line, and wherein said examining step is carried out during said time window.

4. Apparatus for detecting the presence of valid data in a received signal in which the data is identified by a preamble having a predetermined number of bits in a predefined pattern, comprising:

means for examining a predetermined number of successive bits in the received signal to detect whether a first number of said bits, which is less than said predetermined number, match a defined bit pattern;

means responsive to the detection of a match between said first number of bits and said defined pattern for storing said predetermined number of bits; and means for selectively accepting data in said received signal as valid data, said accepting means operating in a first mode in which said predetermined number of bits is examined to determine whether a second number of bits, greater than said first number, match the bits in said defined bit pattern and accepting data as valid data only when said second number of bits match said pattern, and a second mode in which data is accepted as valid data when said first number of bits match said pattern.

5. The apparatus of claim 4, further including means for switching said accepting means from said first mode to said second mode when a preset number of groups of bits are successively determined to contain said second number of bits which match said pattern.

6. The apparatus of claim 4, further including means for switching said accepting means from said second mode to said first mode when a preset number of groups of bits are successively detected as not containing at least said first number of bits which match said pattern.

7. A method for acquiring data transmitted via the horizontal scan lines of a video television signal comprising the steps of:
   processing a horizontal scan line in a first mode by searching for an exact match of a first predetermined number of specified bits in the scan line with a defined bit pattern;
   repeating said step of processing until an exact match is found for a first preset number of successive scan lines;
   indicating when said preset number of successive scan lines have been received; and,
   switching, in response to said indicating step, to a second mode of processing wherein said scan lines are examined to determine whether less than an exact match of said specified bits is present.

8. The method of claim 7, wherein said second mode of processing further includes:
   comparing said specified bits of each horizontal scan line with said defined bit pattern to determine whether a second predetermined number of bits, less than said first predetermined number, match said defined bit pattern;
   detecting when a second preset number of successive scan lines have less than said second predetermined number of bits match said defined bit pattern; and
   returning to said first mode of processing in response to said detecting.

9. The method of claim 7, wherein said processing in said first and second modes includes the step of:
   acquiring data superimposed on said horizontal scan line.

10. The method according to claim 7, wherein said second mode of processing further includes:
   examining said specified bits of a horizontal scan line to determine whether a second predetermined number of specified bits, less than said first predetermined number, match said defined bit pattern;

recording time during which said second predetermined number of specified bits are not matched; and returning to said first mode of processing when said recorded time exceeds a preset time limit.

11. The method of claim 10, wherein said second mode of processing further includes:

detecting when a second preset number of successive scan lines have less than said second predetermined number of specified bits match said defined bit pattern; and returning to said first mode of processing in response to said detecting.

12. Apparatus for acquiring data transmitted via the horizontal scan lines of a video television signal comprising:

means for processing a horizontal scan line in a first mode and a second mode, said processing means including means for searching for an exact match of a first predetermined number of specified bits in the scan line with a defined bit pattern during said first mode, and means for repeating said searching until an exact match is found for a first preset number of successive scan lines;

means for indicating when said first preset number of successive scan lines have been received; and, means for switching, in response to said indicating means, to said second mode of processing wherein less than an exact match of said specified bits is required.

13. The apparatus of claim 12, wherein said processing means further includes:

means for comparing said specified bits of each horizontal scan line during said second mode to determine whether a second predetermined number of bits, less than said first predetermined number, match said defined bit pattern; and, means for detecting when a second preset number of successive scan lines have less than said second predetermined number of bits match said defined bit pattern, said processing means returning to said first mode of processing in response to said detecting means.

14. The apparatus of claim 12, wherein said means for processing further includes:

means for acquiring data superimposed on said horizontal scan line.

15. The apparatus according to claim 12, wherein said processing means further includes:

means for examining said specified bits of a horizontal scan line to determine whether a second predetermined number of specified bits, less than said first predetermined number, match said defined bit pattern; and, means for recording time during which said second predetermined number of specified bits are not matched, said processing means returning to said first mode when said recorded time exceeds a preset time limit.

16. The method of claim 15, wherein said processing means further includes:

means for detecting when a second preset number of successive scan lines have less than said second predetermined number of specified bits match said defined bit pattern, said processing means returning to said first mode in response to said detecting means.

* * * * *